(12) United States Patent
Fahrenbach

(10) Patent No.: US 7,024,991 B2
(45) Date of Patent: Apr. 11, 2006

(54) OVERLOAD SAFETY DEVICE IN A PRESS

(75) Inventor: Juergen Fahrenbach, Aichelberg (DE)

(73) Assignee: Schuler Pressen GmbH & Co. KG, Goeppingen (DE)

( * ) Notice: Subject to any disclaimer, the term of this patent is extended or adjusted under 35 U.S.C. 154(b) by 77 days.

(21) Appl. No.: 10/603,594

(22) Filed: Jun. 26, 2003

(65) Prior Publication Data

US 2004/0003730 A1 Jan. 8, 2004

(30) Foreign Application Priority Data

Jun. 28, 2002 (DE) ................................ 102 29 276

(51) Int. Cl.
*F16P 3/00* (2006.01)

(52) U.S. Cl. ................. 100/346; 100/269.18; 100/270; 72/432

(58) Field of Classification Search ................ 100/270, 100/271, 269.16, 50, 192, 280, 281, 282, 100/341, 342, 346, 269.18; 72/432, 446, 72/453.03, 453.04, 466.3; 192/150; 83/543
See application file for complete search history.

(56) References Cited

U.S. PATENT DOCUMENTS

| | | | |
|---|---|---|---|
| 3,190,141 A * | 6/1965 | Schlatter et al. ............... 74/584 |
| 3,892,143 A * | 7/1975 | Kleister et al. ................ 74/583 |
| 4,030,336 A * | 6/1977 | Grigorenko et al. .......... 72/432 |
| 4,289,066 A * | 9/1981 | Proga .......................... 100/346 |
| 5,638,748 A | 6/1997 | Daniel .......................... 100/53 |
| 6,457,406 B1 * | 10/2002 | Yonezawa et al. .......... 100/346 |

FOREIGN PATENT DOCUMENTS

| | | |
|---|---|---|
| DE | 2242067 | 11/1981 |
| DE | 3407317 | 3/1992 |

* cited by examiner

*Primary Examiner*—Derris H. Banks
*Assistant Examiner*—Jimmy T. Nguyen
(74) *Attorney, Agent, or Firm*—Crowell & Moring LLP

(57) ABSTRACT

In an overload safety device in a press, having a driving device with a drive shaft, a slide carrying out an oscillating movement and a connecting rod which connects the drive shaft with the slide and has a large and a small eye, the connecting rod is provided with a pressure element disposed displaceably in the longitudinal direction of the connecting rod. The pressure element acts at least indirectly upon a fluid such that, when a certain force acts upon the connecting rod, a pressure increase occurs in the fluid. The fluid is guided to a pressure limiting valve which, when a predetermined pressure is exceeded, causes an interruption of the slide movement.

2 Claims, 3 Drawing Sheets

OVERLOAD SAFETY DEVICE IN A PRESS

BACKGROUND OF THE INVENTION

This application claims the priority of Germany, Application No. 102 29 276.0, filed Jun. 28, 2002, the disclosure of which is expressly incorporated by reference herein.

The present invention relates to an overload safety device in a press having a driving device with a drive shaft, a slide for carrying out an oscillating movement, and a connecting rod configured to operatively connect the drive shaft with the slide and having a large and a small eye. The invention also relates generally to a press having a driving device with an overload safety device.

Known safety systems are shown in, for example, DE 25 01 275 C2 and DE 34 07 317 C2. The known safety systems or devices have the disadvantage of a high-expenditure construction and a frequently insufficient operating reliability, which, in practice, can easily result in damage to the press.

SUMMARY OF THE INVENTION

An object of the present invention is to provide an overload safety device in a press which has a simple construction and a reliable method of operation.

According to the invention, this object is achieved by providing that the connecting rod has a pressure element disposed displaceably in a longitudinal direction of the connecting rod to act directly or indirectly upon a fluid such that, when a predetermined force acts upon the connecting rod, a pressure increase occurs in the fluid which is then guided to a pressure limiting valve to cause, when a predetermined pressure is exceeded, an interruption of the oscillating movement of the slide.

According to the present invention, the connecting rod has a pressure element which is disposed to be displaceable in the longitudinal direction of the connecting rod and which, when a certain force is exceeded, acts upon a fluid. This fluid, in turn, causes an interruption of the movement of the slide which, according to the invention, is initiated by the pressure limiting valve to which the fluid is guided.

As a result of this coupling of the mechanical displacement of the pressure element with its effect on the fluid, a very safe method of operation of the device is implemented because the pressure limiting valve can be adjusted very precisely and will then also be triggered within a very narrow range. It is particularly advantageous that the device operates exclusively by way of a fluid and thus does not rely on electrical or electronic triggering devices.

At the same time, a very simple device is provided according to the invention which can be retrofitted particularly also in already existing presses because advantageously only the connecting rod has to be exchanged and high costs can therefore be avoided.

A constructively particularly favorable arrangement of the pressure element can be obtained if, according to an advantageous embodiment of the invention, the latter is arranged in one of the eyes of the connecting rod.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
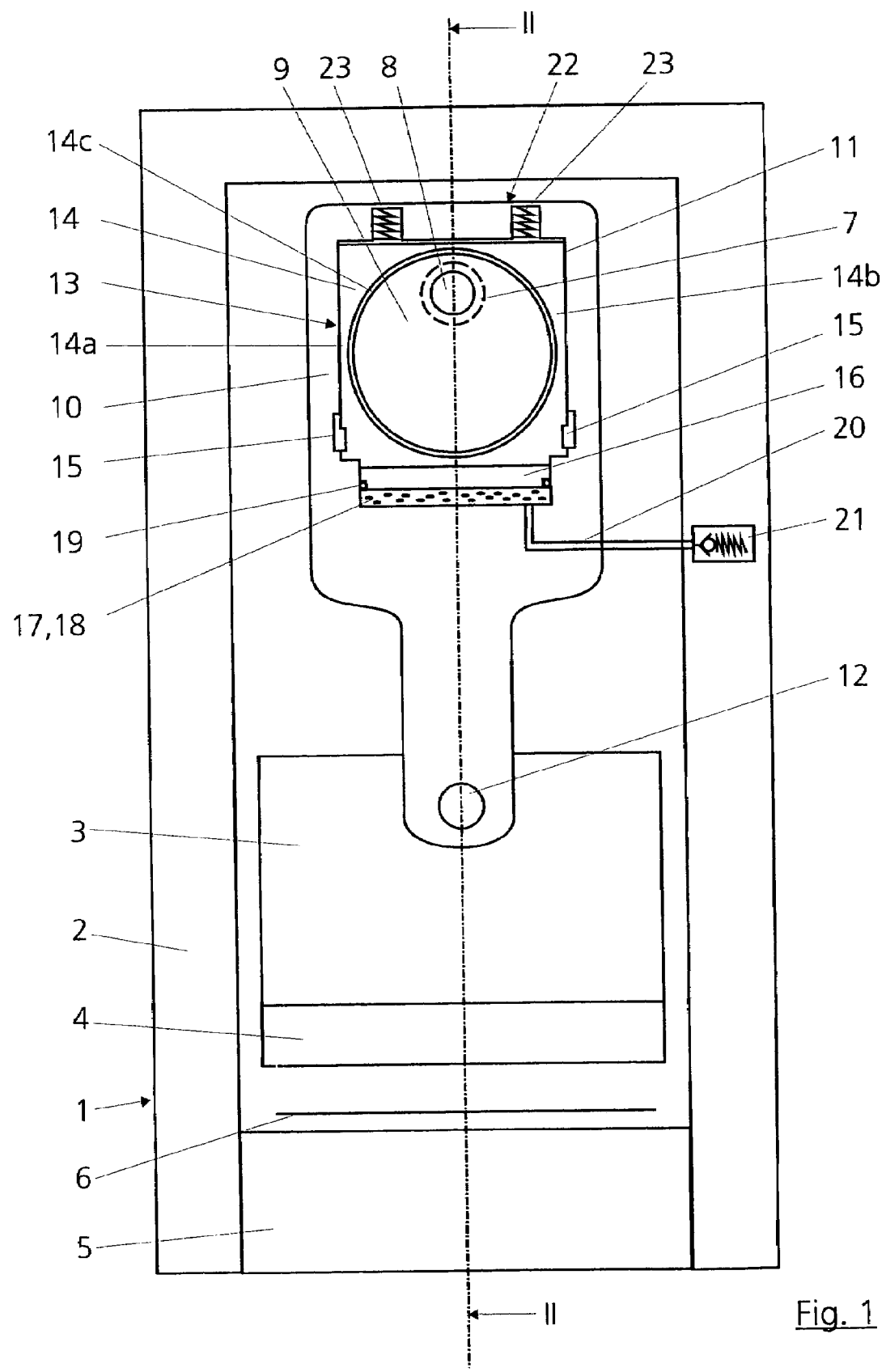
FIG. 1 is an elevational schematic view of a press having an overload safety device according to the present invention.

In a manner generally known per se, a press 1, in the illustrated embodiment, an eccentric press, has a frame 2 in which a slide 3 carries out an oscillating movement. A top tool 4 is mounted on the slide 3 and, for machining workpieces 6, cooperates with a bottom tool 5 rigidly connected with the frame 2. The press 1 also has a driving device 7 which, illustrated only by a dashed circle, is completely visible in FIG. 2 and is constructed, for example, as an electric motor. A drive shaft 8 extends from the driving device 7 and has an eccentric 9 on which a connecting rod 10 is mounted which connects the drive shaft 8 with the slide 3 to thus permit the movement of the slide 3. Instead of being constructed as an eccentric press, the press 1 can also be constructed, for example, as a knuckle joint press without departing from the scope of the present invention. The connecting rod 10 has a large eye 11 for receiving the drive shaft 8 and a small eye 12 for the connection with the slide 3.

Furthermore, the connecting rod 10 is equipped with a device 13 for protecting the press 1 against overloading. The device 13 is provided for stopping the slide 3 when an unacceptably high force which acts upon the top tool 4 and/or the bottom tool 5, and thus also upon the connecting rod 10, is exceeded, thus when the permissible pressure force is exceeded. For this purpose, the device 13 has a pressure element 14 which, in the present case, is slidable along guiding elements 15 inside the large eye 11 of the connecting rod 10 in its longitudinal direction and, when correspondingly stressed, travels a so-called "overload path".

In the present embodiment under discussion, the pressure element 14 has two half shells 14a, 14b and therefore completely surrounds the drive shaft 8. A bearing element 14c constructed as a slide bearing is arranged between the drive shaft 8 and the pressure element 14. Instead of the slide bearing, a roller bearing can, of course, be used. Furthermore, the two half shells 14a, 14b are mutually connected by known types of connection elements 30, 31 which are shown schematically by dashed lines.

As an alternative, it is contemplated that the pressure element 14 can be arranged in the small eye 12 of the connecting rod 10 or at a different point of the connecting rod 10. The accommodation within the large eye 11 is, however, most suitable particularly with respect to the force-related design of the device 13 because the drive shaft 8 will then act directly upon the device 13.

As a result of the influencing force, the pressure element 14 moves by the above-mentioned overload path from its basic position into a triggering position and, in the process, acts upon a pressure piston 16 which is arranged on the side of the pressure element facing the small eye 12 in a cavity and, in turn, acts upon a fluid 18 which is also situated in the cavity 17. The pressure piston 16 is sealed off with respect to the cavity 17 by a sealing device 19 and can be displaced in the direction of the cavity 17. In a manner which need not be illustrated, the pressure piston 16 can have an essentially oval cross-section which optimally utilizes the cross-section of the connecting rod 10 and has a relatively flat construction as will be apparent to one skilled in the art.

The fluid 18, e.g., a hydraulic medium, preferably oil, is guided by a pipe 20 to a pressure limiting valve 21, which is also called a cartridge and is triggered when a predetermined pressure is exceeded in the fluid 18 and, in a manner described below, leads to an interruption of the drive of the slide 3. In this case, the force exercised by the pressure piston 16 upon the fluid 18 corresponds to a force exercised on the connecting rod 10, and the pressure limiting valve 21 can be adjusted such with respect to its triggering force that, starting at a certain force acting upon the connecting rod 10, the drive of the slide 3 is interrupted, so that the press 1 can be adapted to different workpieces or tools 4, 5.

When the overload safety device 13 of the press 1 has been triggered, the disturbance which had led to the overloading of the connecting rod 10, and thus to the triggering of the device 13, is eliminated. The press 1 can subsequently resume its operation, for the purpose of which the pressure element 14 is provided with a restoring device 22 by way of which the pressure element 14 can be moved from its triggered position into its basic position. In the illustrated embodiment, the restoring device 22 has two spring elements 23 for the withdrawal of the pressure element 14. This restoring device may, however, also be constructed as an air pump in order to move the pressure element 14 into its basic position.

Figure 2:
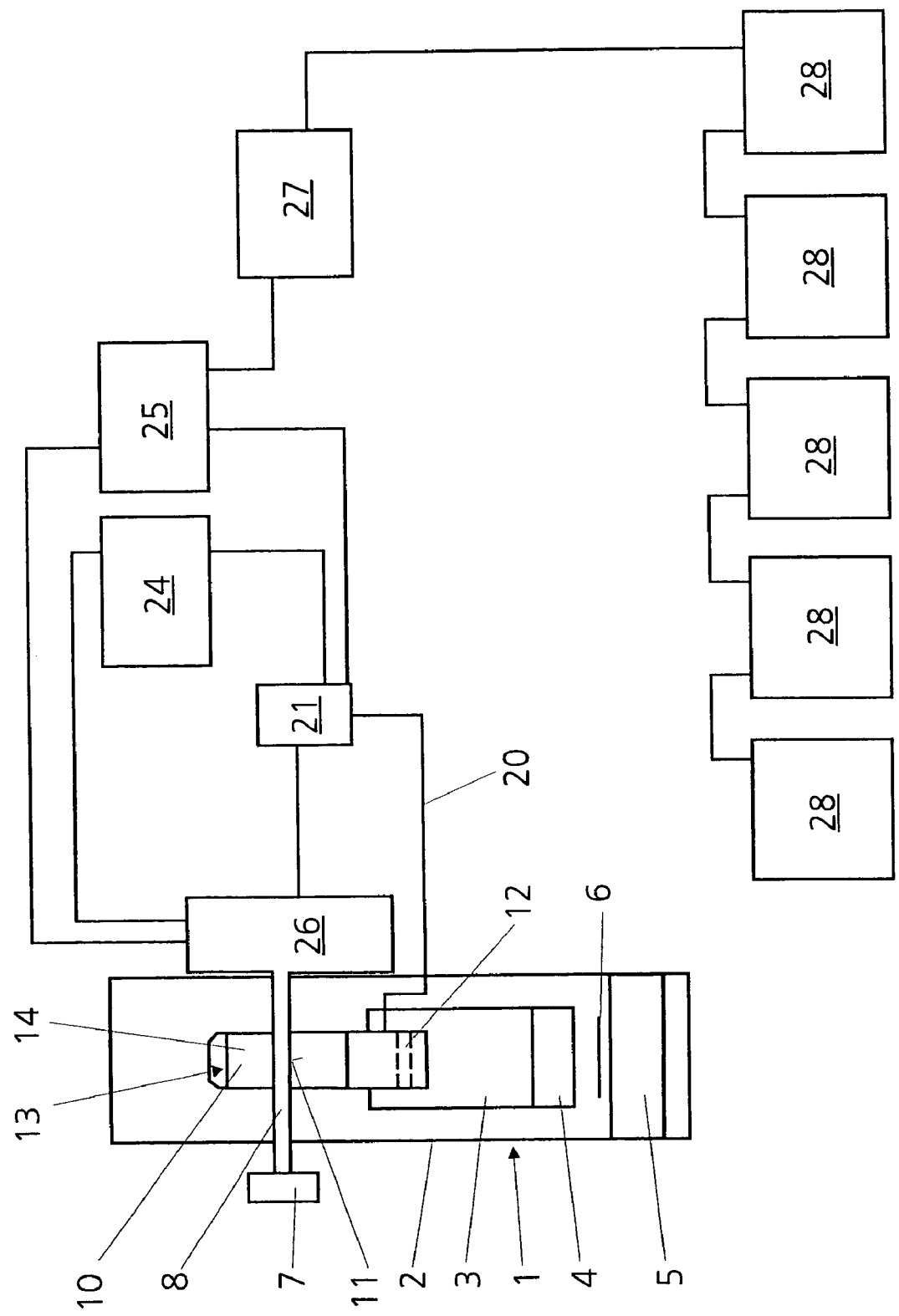
FIG. 2 is a schematic view of the device of FIG. 1, with the pressure limiting valve connected in a schematically shown safety circuit for switching off the press.

As illustrated in FIG. 2, the pressure limiting valve 21 is connected with two safety valves 24, 25 which are also triggered when the pressure limiting valve 21 is triggered. When safety valve 24 responds, it uncouples a flywheel 26 of the press 1, and safety valve 25 acts upon a brake which acts upon the driving device 7, as required, by way of the drive shaft 8. In this manner, it is ensured that the drive of the slide 3 is interrupted. This provides a possibility of stopping the slide 3, in which the pressure limiting valve 21 can also act directly upon the flywheel 26. Here, the safety valves 24, 25 are also constructed as pressure control valves and are coupled with another safety valve 27 which can also establish the connection to the brake or the coupling.

Figure 3:
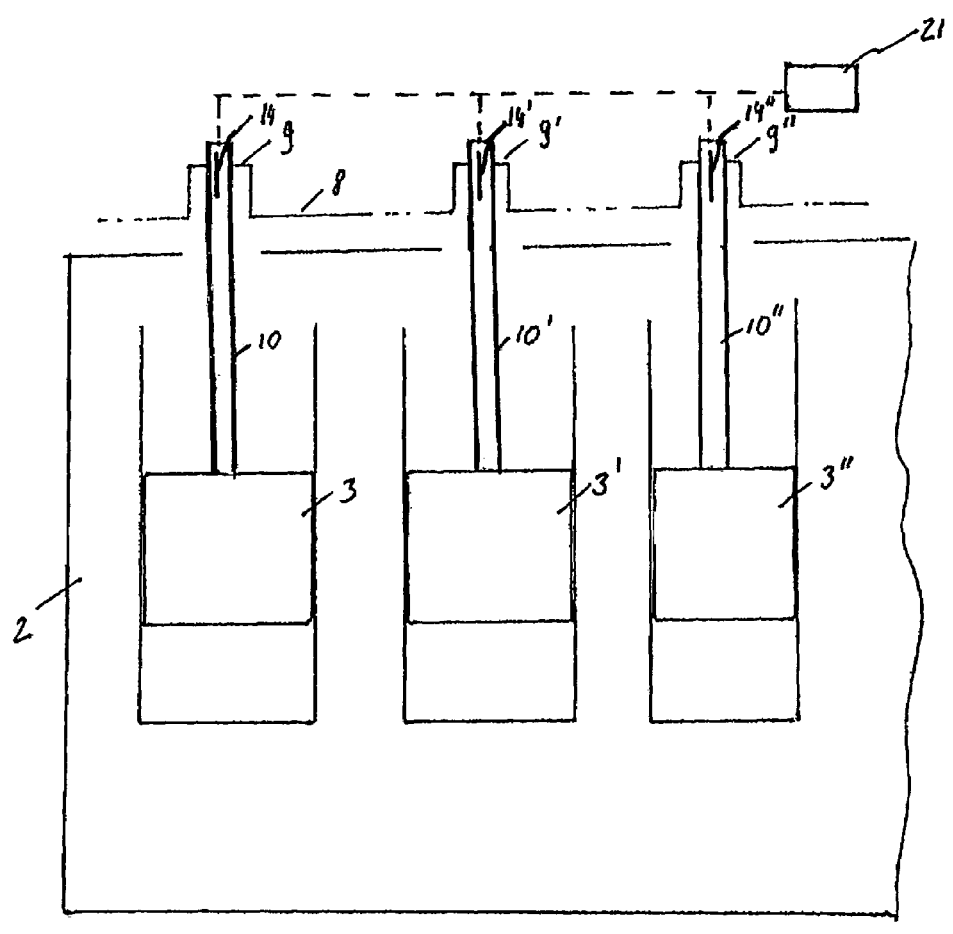
FIG. 3 is a schematic view of the device of FIG. 1 showing a plurality of slides and connecting.

Furthermore, several pilot valves 28 are shown in FIG. 2 and are used when the press 1 has several slides, i.e., as a press working line or press system with several press stations as seen in FIG. 3. These pilot valves 28, which in the illustrated embodiment are coupled to the safety valve 27, have the effect that, in the event of an overloading of one of the connecting rods 10, all overload safety devices 13 of the respective press station and all slides 3 are made load-free. This is implemented in that the fluids 18 of all devices 13 are connected with one another. This connection may be provided on the primary side or on the secondary side. All valves 24, 25, 26, 27 and 28 can be constructed as so-called cartridges, where a movable cylinder is provided as a triggering device and causes the breakdown of the oil pressure. Optionally, safety valves may also be provided for an ejector system of the press 1 as will be known to one skilled in the art.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Overload safety device for use in a press, comprising a driving device with a drive shaft, a slide for carrying out an oscillating movement, and a connecting rod configured to operatively connect the drive shaft with the slide and said connecting rod having a large and a small eye, wherein the connecting rod has a pressure element disposed displaceably in a longitudinal direction of the connecting rod to act upon a fluid such that, when a predetermined force acts upon the connecting rod, a pressure increase occurs in the fluid which is then guided to a pressure limiting valve to cause, when a predetermined pressure is exceeded, an interruption of the oscillating movement of the slide wherein the pressure element comprises two half shells and substantially completely surrounds the drive shaft.

2. Device according to claim 1, wherein the two half shells are mutually connected by connecting elements.

* * * * *